United States Patent [19]

Pollock et al.

[11] 4,110,480

[45] Aug. 29, 1978

[54] TREATMENT OF MALT TO REDUCE STALE FLAVOR IN BEER

[75] Inventors: James Richard Allan Pollock, Reading; Anthony Richard Dale, Mortimer, near Reading, England

[73] Assignee: Pollock International Limited, Reading, England

[21] Appl. No.: 598,421

[22] Filed: Jul. 23, 1975

[30] Foreign Application Priority Data

Jul. 24, 1974 [GB] United Kingdom ............... 32704/74

[51] Int. Cl.² .......................... C12C 1/16; C12C 1/18
[52] U.S. Cl. ..................................... 426/436; 426/16; 426/29; 426/64
[58] Field of Search ..................... 426/28, 29, 64, 429, 426/430, 436, 16

[56] References Cited

U.S. PATENT DOCUMENTS 2,420,567   5/1947   Selman et al. ....................... 426/430

OTHER PUBLICATIONS

Spillane et al., The Use of Acetic Acid and Sulphur Dioxide to Limit Malting Losses, J. Inst. Brew., vol. 72, 1966, (pp. 398–403).

*Primary Examiner*—David M. Naff
*Attorney, Agent, or Firm*—Larson, Taylor and Hinds

[57] ABSTRACT

Stale flavor formation in beer is reduced by contracting malt, prior to extracting to produce wort, with a primary or secondary mono- or polyhydric alcohol or with acetic acid or with dimethylsulfoxide to reduce the amount of precursors of 2-trans-nonenal present in the malt.

7 Claims, No Drawings

TREATMENT OF MALT TO REDUCE STALE FLAVOR IN BEER

This invention relates to the reactions involved in the production of stale flavours in beer and is especially concerned with influencing such reactions.

A significant part of the processes whereby stale flavours arise in beer is known to involve the oxidation of long-chain fatty acids, and the subsequent degradation to highly flavouring substances such as 2-trans-nonenal. Those processes have been well studied and are believed to occur through enzyme mediated oxidation of unsaturated fatty acids, such as linoleic acid, with eventually oxidative or non-oxidative scission of the carbon chain to give flavour-active compounds having carbon lengths of 6 to 12.

In studying those reactions a new phenomenon has been discovered which influences the reactions involved and can be used to reduce the information of intermediate substances involved in the production of stale flavours.

A wort is the liquor run off after extracting a prepared solid material, a cereal grain, with hot water.

According to the invention a method of producing a wort for use in brewing comprises extracting a solid material with hot water, and separating the wort so formed from the insoluble matter, wherein before the solid material is extracted with hot water it is treated with a polar organic substance.

The solid material which will normally be ground malt contains a mixture of substances ordinarily present in malt or cereals which upon oxidation tend to give rise to volatile products such as 2-trans-nonenal which are characteristic of some aspects of stale flavour.

The time of contact of the polar organic substance can be as low as 30 minutes but is preferably in the region of 24 hours.

The organic substance may be a primary or secondary mono- or polyhydric alcohol or acetic acid.

The treated solid material is thus affected in such a way as to be less susceptible to the rapid formation of stale flavours in subsequent processing.

The organic substance may be utilised, it sufficiently volatile, in the vapour phase, otherwise treatment is with the liquid.

If the organic substance is suitable it may be left in the solid material, or at least partially removed by volatilization or by extraction with an inactive solvent.

In an example the method according to the invention was applied to malt and then wort was prepared from the treated malt by extraction with hot water at 65° C. for 1 hour and separation from the insoluble solids. The quantities of substances present in the wort which were capable of forming 2-trans-nonenal were then estimated. The liquids were added to the malt or ground malt to an amount of 5% weight to weight and contact was for 24 hours.

EXAMPLE 1

| Substances used to treat malt | % reduction of precursors of 2-trans-nonenal |
|---|---|
| methanol (as vapour) | 72 |
| ethanol (as vapour) | 65 |
| methanol (as liquid) | 75 |
| ethanol (as liquid) | 60 |

| Substances used to treat ground malt | | % reduction of precursors of 2-trans-nonenal |
|---|---|---|
| added as vapour: | | |
| methanol | | 78 |
| added as liquids: | | |
| methanol | | 80, 77 |
| ethanol | | 63 |
| 1-propanol | | 27 |
| 2-propanol | | 30 |
| 1-butanol | | 19 |
| 2-butanol | | 45 |
| Isoamyl alcohol | | 30 |
| 2-phenylethanol | | 50 |
| dimethyl sulphoxide | | 66 |
| ethyl acetate | | 0 |
| acetone | | 0 |
| acetic acid | | 80 |
| light petroleum | | 0 |
| propylene glycol | | 56 |
| aqueous methanol | (2:1 v/v) | 27 |
| | (1:1 v/v) | 65 |
| | (1:2 v/v) | 69 |

It can be seen that substances of polarity equal to and less than that of acetone were ineffective while substances polar than acetone were effective.

The reduction of the tendency of beers made from such worts to give stale flavours of the type characterized by 2-trans-nonenal is at least proportional to the reduction in concentration in wort of the precursors of that substance.

In general, the desirable qualities of the malt or cereal grain do not appear to be adversely affected by the treatment which thus appears to be fairly specific and thus can, in suitable circumstances, be used industrially to improve the quality of the worts used for brewing and eventually of the beers made from them.

I claim:

1. In a method of producing a wort for use in brewing which comprises extracting a ground malt with hot water to orm a wort and separating the wort from insolublematter, the improvement which comprises reducing the tendency of beers made from such worts to give stale flavors of the type characterized by 2-trans-nonenal by contacting, prior to extracting the ground malt with hot water, malt or ground malt with an organic substance selected from the group consisting of methanol, ethanol, 1-propanol, 2-propanol, 2-butanol, isoamyl alcohol, 2-phenylethanol, dimethylsulfoxide, acetic acid, and propylene glycol to reduce the amount of precursors of 2-trans-nonenal present in said malt or ground malt.

2. An improved method according to claim 1 wherein said organic substance is in liquid form.

3. An improved method according to claim 1 wherein said organic substance is in vapor form.

4. An improved method according to claim 1 wherein said organic substance is selected from the group consisting of methanol, ethanol, 1-propanol, 2-propanol, 2-butanol, isoamyl alcohol and 2-phenylethanol.

5. An improved method according to claim 4 wherein said organic substance comprises ethanol.

6. An improved method according to claim 1 wherein the amount of organic substance is 5% by weight of the malt or ground malt.

7. An improved method according to claim 6 wherein the malt or ground malt is contacted with the organic substance for a period of 24 hours.

* * * * *